(12) United States Patent
Romsburg, Sr. et al.

(10) Patent No.: US 7,611,178 B2
(45) Date of Patent: Nov. 3, 2009

(54) PAN LIFTING IMPLEMENT

(76) Inventors: Paul Romsburg, Sr., 9739 Lock Tender La., Williamsport, MD (US) 21795; Paul Romsburg, Jr., 16617 Johnson Dr., Williamsport, MD (US) 21795; Roy Romsburg, 10915 Bayberry Ct., Hagerstown, MD (US) 21740

( * ) Notice: Subject to any disclaimer, the term of this patent is extended or adjusted under 35 U.S.C. 154(b) by 705 days.

(21) Appl. No.: 11/436,586

(22) Filed: May 19, 2006

(65) Prior Publication Data

US 2006/0208512 A1 Sep. 21, 2006

Related U.S. Application Data

(63) Continuation-in-part of application No. 11/083,268, filed on Mar. 18, 2005, now abandoned.

(51) Int. Cl.
*A47J 45/00* (2006.01)
(52) U.S. Cl. ............................................. 294/31.1
(58) Field of Classification Search ............... 294/27.1, 294/28, 31.1; D7/395, 688; 81/420; 220/759; 16/425
See application file for complete search history.

(56) References Cited

U.S. PATENT DOCUMENTS

| | | | |
|---|---|---|---|
| 641,019 A | 1/1900 | Kiefer et al. | |
| 1,783,830 A * | 12/1930 | Denmark et al. | 294/31.1 |
| 2,005,032 A | 6/1935 | Haemmerle | |
| 2,090,674 A * | 8/1937 | Grenzeback | 294/31.1 |
| 2,478,881 A | 8/1949 | Wayrynen | |
| 2,700,910 A | 2/1955 | Van Niel | |
| D229,052 S | 11/1973 | Courtney | |
| 4,078,839 A | 3/1978 | Chambers et al. | |
| 4,149,435 A | 4/1979 | Smith | |
| 4,171,144 A | 10/1979 | Rodriguez | |
| 4,559,853 A | 12/1985 | Oye | |
| 4,787,139 A | 11/1988 | Sweet | |
| 5,095,732 A | 3/1992 | Bootka | |
| 5,511,467 A | 4/1996 | Motley et al. | |
| 6,216,568 B1 | 4/2001 | Breiling | |
| 6,721,996 B2 | 4/2004 | Tippman, Sr. | |
| D542,608 S * | 5/2007 | Romsburg et al. | D7/688 |
| 2006/0208511 A1* | 9/2006 | Romsburg et al. | 294/31.1 |

* cited by examiner

*Primary Examiner*—Paul T Chin
(74) *Attorney, Agent, or Firm*—Stephen R. Greiner

(57) ABSTRACT

An implement for lifting pans from steam tables. The implement includes a pair of pivotally connected, crisscrossing levers. A first jaw is affixed to the front of one of the levers. The first jaw includes a lifting plate having an anchor portion with opposed sides and a relatively wider cantilever portion affixed to, and extending forwardly and outwardly from, the anchor portion. A pair of backstops is affixed to the lifting plate. Each of the backstops has a longitudinal portion extending upwardly from a respective one of the opposed sides of the anchor portion and a lateral portion extending outwardly from the front of a respective one of the longitudinal portions as well as upwardly from the rear of the cantilever portion. A second jaw is affixed to the other one of said levers and includes a shank portion positioned above the backstops and a hook portion extending forwardly and downwardly from the shank portion.

3 Claims, 1 Drawing Sheet

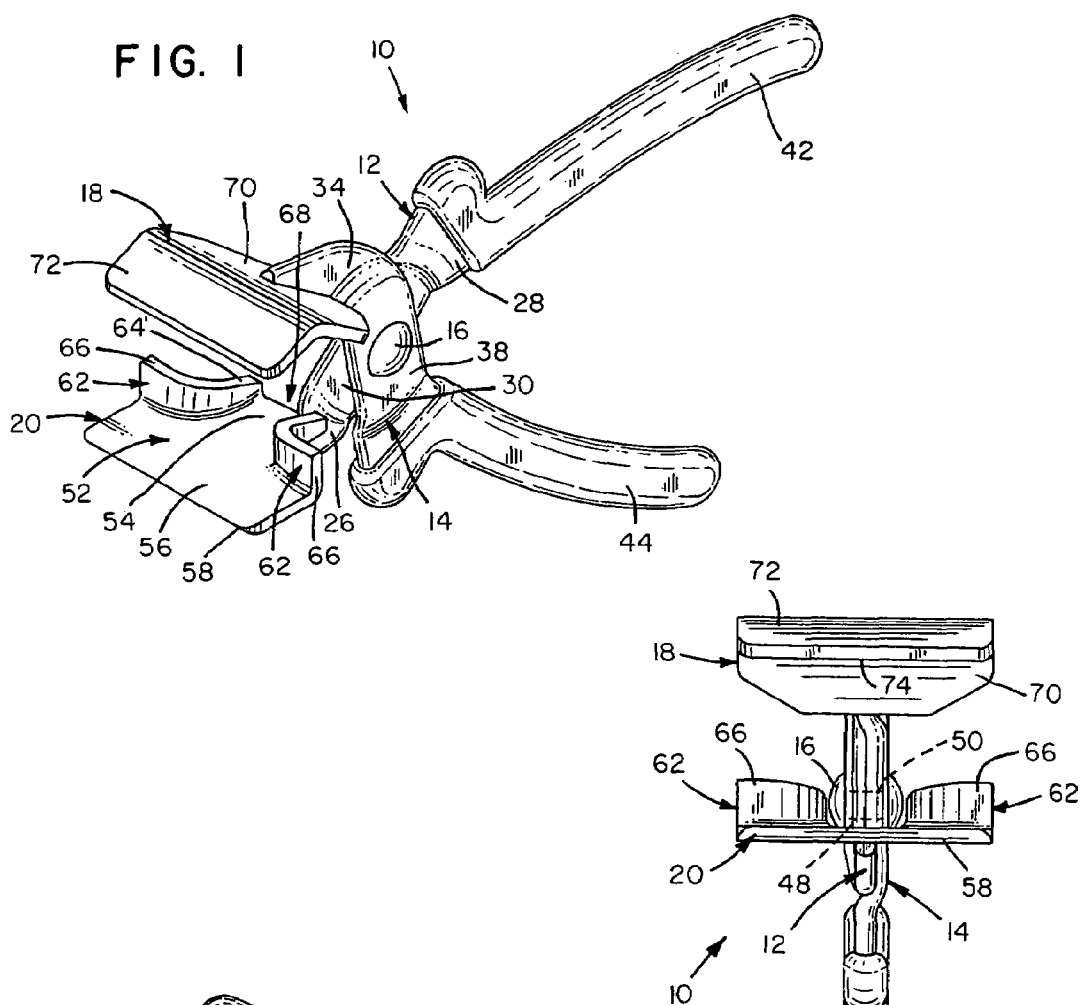
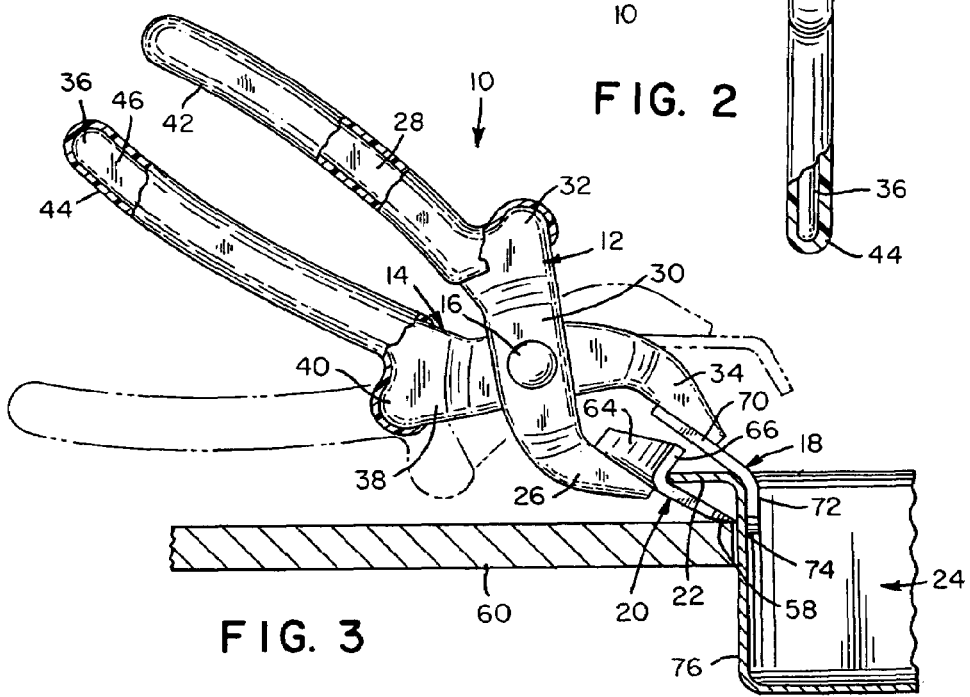

PAN LIFTING IMPLEMENT

CONTINUING APPLICATION DATA

This application is a continuation-in-part of U.S. patent application Ser. No. 11/083,268, filed on Mar. 18, 2005, now abandoned.

FIELD OF THE INVENTION

The present invention relates generally to tools with jaws positioned by relatively movable plural handles and, more particularly, to such tools with jaws that extend laterally beyond the side edge planes of the handles.

BACKGROUND OF THE INVENTION

For decades, caterers and restaurateurs have confronted the problems associated with moving food-filled, serving pans to and from steam tables. These pans are typically hot, heavy and bulky, necessitating that they be handled with great care to avoid scalding. Furthermore, a lack of handles makes serving pans difficult to grasp, let alone lift and carry. Of course, a spill from a pan used at a steam table wastes food and can be time-consuming to clean.

An improvised method is normally used to dislodge a pan from a steam table. It can involve using a knife or fork as a prying tool to raise the lip of a pan from a steam table and, then, grasping the pan with towel-covered hands. Once grasped, the pan is toted to a kitchen for refilling or cleaning. Moving the pan back to the steam table requires a similar procedure, but the use of a prying tool is not required in setting the pan onto the table. Regardless of the direction of movement of the pan, however, the towel sometimes falls into the pan, contaminating food in the pan and making the food unfit for human consumption.

SUMMARY OF THE INVENTION

In light of the problems associated with the known practices associated with moving serving pans to and from steam tables, it is a principal object of the invention to provide an implement that permits a user to safely lift a serving pan from a hot well, steamer, or food warmer and to transport the pan to any desired location. Use of the implement minimizes the likelihood of scalds, burns, pinched fingers and other lost time injuries.

Still another object of the invention is to provide an implement of the type described that firmly grips a pan as it is being lifted and carried so that the likelihood of embarrassing and wasteful food spills is minimized. The grip on the pan is enhanced by providing the implement with jaws that channel spilled food away from the pan.

It is an additional object of the invention to provide an implement of the type described that impresses onlookers in a restaurant environment or catered setting who observe pans being lifted and carried about in an expert manner.

It is another object of the invention to provide an implement of the type described that does not, in ordinary use, contact food in a serving pan, thereby minimizing the likelihood of food contamination. Thus, use of the implement promotes good sanitation practices.

It is an object of the invention to provide improved features and arrangements thereof in a pan lifting implement for the purposes described that is lightweight in construction, inexpensive to manufacture, and fully dependable in use.

Briefly, the implement in accordance with this invention achieves the intended objects by featuring a pair of pivotally connected, crisscrossing levers and a pair of jaws, each being affixed to the front end of a respective one of the levers. One of the jaws has a T-shaped lifting plate with an anchor portion and a relatively wider cantilever portion affixed to, and extending forwardly and outwardly therefrom. A pair of L-shaped backstops is affixed to the lifting plate. Each of the backstops has a longitudinal portion extending upwardly from a respective one of the opposed sides of the anchor portion and a lateral portion extending outwardly from the front of a respective one of the longitudinal portions. A second jaw is affixed to the other one of said levers and includes a shank portion positioned above the backstops and a hook portion extending forwardly and downwardly from the shank portion.

The foregoing and other objects, features and advantages of the present invention will become readily apparent upon further review of the following detailed description of the preferred embodiment as illustrated in the accompanying drawings.

BRIEF DESCRIPTION OF THE DRAWINGS

The present invention may be more readily described with reference to the accompanying drawings, in which:

FIG. 1 is a perspective view of a pan lifting implement in accordance with the present invention.

FIG. 2 is a front view of the pan lifting implement of FIG. 1.

FIG. 3 is a side view of the pan lifting implement shown lifting a pan.

Similar reference characters denote corresponding features consistently throughout the accompanying drawings.

DETAILED DESCRIPTION OF THE PREFERRED EMBODIMENT

Referring now to the FIGS., a pan lifting implement in accordance with the present invention is shown at 10. Implement 10 includes a pair of levers 12 and 14 connected together by a pivot pin 16 in the crisscrossing manner of pliers. Levers 12 and 14 carry a pair of jaws 18 and 20 for grasping the peripheral rim 22 of a pan 24.

Lever 12 has a keeper portion 26 and a relatively longer handle portion 28 joined together by a diagonal crosspiece 30 that extends upwardly from the rear of keeper portion 26 to the front of handle portion 28. Portions 26 and 28 are substantially parallel to one another and are vertically offset such that keeper portion 26 has a lower elevation than that of handle portion 28 during usage of implement 10. Furthermore, portions 26 and 28 are coplanar with crosspiece 30 being laterally offset into a parallel plane away from lever 14. An upward projection 32 at the top of crosspiece 30 serves as a stop to prevent a hand grasping levers 12 and 14 from sliding forward to contact pan 24.

Lever 14 has a keeper portion 34 and a relatively longer handle portion 36 joined together by a crosspiece 38 that extends downwardly from the rear of keeper portion 34 to the front of handle portion 36. Portions 34 and 36 are substantially parallel to one another and are vertically offset such that keeper portion 34 has a higher elevation than that of handle portion 36 during usage of implement 10. Also, portions 34 and 36 are coplanar with crosspiece 38 being laterally offset into a parallel plane away from lever 12. A downward projection 40 at the bottom of crosspiece 38 serves as a stop to prevent a hand from contacting pan 24.

To minimize the transfer of heat to the hand of a user of implement 10, levers 12 and 14 are provided with plastic handgrips 42 and 44. Handgrip 42 covers handle portion 28 and adjacent projection 32. Handgrip 44, however, covers handle portion 36 and projection 40. Notches, as at 46, provided in the tops and bottoms of handle portions 28 and 36, facilitate a good bond between handgrips 42 and 44 and levers 12 and 14. Although not shown for the sake of drawing simplicity, the exteriors of handgrips 42 and 44 may be textured to enhance the grasp that a user can maintain upon implement 10 in wet working conditions.

Crosspieces 30 and 38 are provided with transverse apertures 48 and 50 at their respective midpoints. With apertures 48 and 50 in registry with one another and with portions 26, 28, 34, and 36 all in the same plane, pivot pin 16 is extended through apertures 48 and 50 and its opposite ends are flattened to connect levers 12 and 14 together in a crisscrossing relationship. The crisscrossing relationship involves crosspieces 30 and 38 crossing one another with the front of crosspiece 38 being elevated above the front of crosspiece 30.

The lower jaw 20 comprises a T-shaped lifting plate 52 with an anchor portion 54 at its rear that is affixed to the top of keeper portion 26 and a cantilever portion 56, with a width adequate to grasp pan 24 in a stable manner, that projects forwardly from the front of anchor portion 54. A beveled edge 58 is provided along the front of cantilever portion 56 for easily sliding jaw 20 along the top of a steam table 60 and under the rim 22 of pan 24 seated upon table 60.

A pair of backstops 62 is affixed to, and extends upwardly from, lifting plate 52 to stiffen lifting plate 52 and assist in grasping pan 24. Each of backstops 62 is L-shaped has a longitudinal portion 64 that extends upwardly from a respective one of the sides of anchor portion 54 and has a lateral portion 66 that extends outwardly from anchor portion 54 and upwardly from the rear of cantilever portion 56. Between backstops 62, a slot 68 is defined that channels food or other debris, that may be scooped up by cantilever portion 56 while lifting pan 24, rearwardly from cantilever portion 56 and lateral portions 66 to ensure positive contact between jaw 20 and rim 22 is always achieved and maintained while using implement 10 to transport pan 24.

Upper jaw 18 is hook-shaped, having a shank portion 70 at its rear that is affixed to the bottom of keeper portion 34 and a hook portion 72 that is affixed to, and projects forwardly and downwardly from, the front of shank portion 70. The front of hook portion 72 is defined by a free edge 74 that contacts beveled edge 58 of jaw 20 when handle portions 28 and 36 are fully squeezed together.

Use of pan lifting implement 10 is straightforward. First, with serving pan 24 positioned on steam table 60 and jaws 18 and 20 in an open position, beveled edge 58 of cantilever portion 56 is slid beneath rim 22 so that the free edge of rim 22 is driven into the junctions of cantilever portion 56 and lateral portions 66. Next, handle portions 28 and 36 are squeezed together to position upper jaw 18 over rim 22 as illustrated by the solid line positioning in FIG. 3. Now, with hook portion 72 of jaw 18 positioned within pan 24 and against the top of pan side wall 76 and shank portion 70 atop rim 22, pan 24 is fully lifted and carried anywhere. The entire lifting process requires only a few seconds to complete.

When pan 24 has been carried to a desired location, a user releases handle portions 28 and 36. With no resisting force, jaws 18 and 20 are moved apart thereby freeing implement 10 from pan 24. Implement 10 can now be immediately reused if circumstances require or set aside for use at a later time. Because of its compact size, implement 10 can be conveniently stored in a drawer or other convenient location like the pocket of a restaurant worker. Should implement 10 ever contact food during use, it can be easily washed with soap and water.

While pan lifting implement 10 has been described with a high degree of particularity, it will be appreciated by those skilled in the art that modifications can be made to it. Therefore, it is to be understood that the present invention is not strictly limited to pan lifting implement 10 described above, but encompasses any and all embodiments of a pan lifting implement within the scope of the following claims.

We claim:

1. A pan lifting implement, comprising:
a pair of pivotally connected, crisscrossing levers; and,
a first jaw being affixed to the front of one of said levers, said first jaw including:
  a lifting plate having an anchor portion with opposed sides and a relatively wider cantilever portion being affixed to, and extending forwardly and outwardly from, said anchor portion;
  a pair of backstops being affixed to said lifting plate, each of said backstops including:
    a longitudinal portion extending upwardly from a respective one of said opposed sides of said anchor portion; and,
    a lateral portion extending outwardly from the front of a respective one of said longitudinal portions and upwardly from the rear of said cantilever portion; and,
a second jaw is affixed to the other one of said levers and includes a shank portion being positioned above said backstops and a hook portion extending forwardly and downwardly from said shank portion.

2. A pan lifting implement, comprising:
a first lever including a first keeper portion at the front end thereof and a first handle portion at the rear end thereof being joined together by a first crosspiece, said first keeper portion and said first handle portion being vertically offset so that said first keeper portion has a lower elevation than that of said first handle portion;
a second lever including a second keeper portion at the front end thereof and a second handle portion at the rear end thereof being joined together by a second crosspiece, said second keeper portion and said second handle portion being vertically offset so that said second keeper portion has a lower elevation than that of said first handle portion;
a pivot pin passing through said first crosspiece and said second crosspiece so as to pivotally connect said first lever and said second lever together;
a first jaw being affixed to said first keeper portion of said first lever and extending laterally beyond the opposite sides of said first lever, said first jaw including:
  a lifting plate having an anchor portion with opposed sides and a relatively wider cantilever portion being affixed to, and extending forwardly and outwardly from, said anchor portion;
  a pair of backstops, each of said backstops being affixed to said lifting plate and each of said backstops including:
    a longitudinal portion extending upwardly from a respective one of said opposed sides of said anchor portion; and,
    a lateral portion extending outwardly from the front of a respective one of said longitudinal portions and upwardly from the rear of said cantilever portion; and, a second jaw being affixed to said second keeper portion of said second lever and extending laterally beyond the opposite sides of said second lever, said second jaw including a shank portion being positioned above said backstops and a hook portion extending downwardly and forwardly from said shank portion.

3. A pan lifting implement, comprising:

a first lever including a first keeper portion at the front end thereof and a first handle portion at the rear end thereof being joined together by a first crosspiece, said first keeper portion and said first handle portion being vertically offset so that said first keeper portion has a lower elevation than that of said first handle portion;

a second lever including a second keeper portion at the front end thereof and a second handle portion at the rear end thereof being joined together by a second crosspiece, said second keeper portion and said second handle portion being vertically offset so that said second keeper portion has a lower elevation than that of said first handle portion;

a pivot pin passing through said first crosspiece and said second crosspiece so as to pivotally connect said first lever and said second lever together;

a first jaw being affixed to said first keeper portion of said first lever and extending laterally beyond the opposite sides of said first lever, said first jaw including a T-shaped lifting plate having an anchor portion, being positioned atop said first keeper portion, with opposed sides and a relatively wider cantilever portion being affixed to, and extending forwardly and outwardly from, said anchor portion;

a pair of L-shaped backstops, each of said backstops being affixed to said lifting plate in a spaced-apart relationship so as to define a slot therebetween, and each of said backstops including:

a longitudinal portion extending upwardly from a respective one of said opposed sides of said anchor portion; and, a lateral portion extending outwardly from the front of a respective one of said longitudinal portions and upwardly from the rear of said cantilever portion; and, a second jaw being affixed to the bottom of said second keeper portion of said second lever and extending laterally beyond the opposite sides of said second lever, said second jaw including a shank portion being positioned above said backstop and a hook portion extending downwardly from said shank portion for grasping the inner edge of the rim of a pan.

* * * * *